(12) United States Patent
Fan et al.

(10) Patent No.: US 12,282,241 B2
(45) Date of Patent: Apr. 22, 2025

(54) DISPLAY PANEL AND DISPLAY DEVICE

(71) Applicants: Fuzhou BOE Optoelectronics Technology Co., Ltd., Fujian (CN); BOE Technology Group Co., Ltd., Beijing (CN)

(72) Inventors: Wenli Fan, Beijing (CN); Tao Fang, Beijing (CN); Meiying Li, Beijing (CN); Zecun Zeng, Beijing (CN); Liqing Yao, Beijing (CN); Xin Fang, Beijing (CN); Shanshan Xu, Beijing (CN); Wenchao Wang, Beijing (CN); Sang Jin Park, Beijing (CN); Baoqiang Wang, Beijing (CN); Kai Diao, Beijing (CN)

(73) Assignees: Fuzhou BOE Optoelectronics Technology Co., Ltd., Fujian (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/564,104

(22) PCT Filed: May 28, 2021

(86) PCT No.: PCT/CN2021/097001
§ 371 (c)(1),
(2) Date: Nov. 27, 2023

(87) PCT Pub. No.: WO2022/246859
PCT Pub. Date: Dec. 1, 2022

(65) Prior Publication Data
US 2024/0248360 A1    Jul. 25, 2024

(51) Int. Cl.
*G02F 1/1368*    (2006.01)
*G02F 1/1343*    (2006.01)
*G02F 1/1362*    (2006.01)

(52) U.S. Cl.
CPC ...... *G02F 1/1368* (2013.01); *G02F 1/134372* (2021.01); *G02F 1/136209* (2013.01); *G02F 1/136286* (2013.01)

(58) Field of Classification Search
None
See application file for complete search history.

(56) References Cited

U.S. PATENT DOCUMENTS

2006/0221027 A1* 10/2006 Ishihara ............ G02F 1/133512
345/88
2011/0255028 A1* 10/2011 Nishizawa ........ G02F 1/136209
349/62

(Continued)

FOREIGN PATENT DOCUMENTS

CN    101038379 A    9/2007
CN    108681146 A    10/2018

(Continued)

OTHER PUBLICATIONS

International Search Report for PCT/CN2021/097001 Mailed Mar. 1, 2022.

*Primary Examiner* — Shan Liu
(74) *Attorney, Agent, or Firm* — Ling Wu; Stephen Yang; Ling and Yang Intellectual Property

(57) ABSTRACT

The display panel comprises: a plurality of pixels arranged in an array. Each pixel comprises a plurality of subpixels. The plurality of pixels arranged in an array comprise: a plurality of pixel rows. Each pixel row comprises a plurality of subpixels arranged in a first direction. The plurality of pixel rows extend in a second direction. The first direction intersects with the second direction. The display panel comprises: a first array substrate and a first opposing substrate arranged opposite to each other, and a first liquid crystal layer located between the first array substrate and the first opposing substrate. The first array substrate comprises:

(Continued)

a plurality of first driving transistors arranged in an array. At least one pixel is arranged between two adjacent first driving transistors in the first direction. The first opposing substrate comprises: a plurality of light shielding portions in one-to-one correspondence to the first driving transistors.

10 Claims, 11 Drawing Sheets

(56) References Cited

U.S. PATENT DOCUMENTS

| | | | |
|---|---|---|---|
| 2015/0325705 A1* | 11/2015 | Choi | G02F 1/1368 438/157 |
| 2018/0210247 A1* | 7/2018 | Ono | G02F 1/136286 |
| 2018/0217424 A1* | 8/2018 | Murakoso | G02F 1/1339 |
| 2018/0217432 A1 | 8/2018 | Mori et al. | |
| 2018/0259818 A1* | 9/2018 | Nakagawa | G02F 1/136209 |

FOREIGN PATENT DOCUMENTS

| | | |
|---|---|---|
| CN | 110750009 A | 2/2020 |
| CN | 111025806 A | 4/2020 |

\* cited by examiner

DISPLAY PANEL AND DISPLAY DEVICE

CROSS-REFERENCE TO RELATED APPLICATIONS

The present application is a U.S. National Phase Entry of International Application PCT/CN2021/097001 having an international filing date of May 28, 2021, and the contents disclosed in the above-mentioned application are hereby incorporated as a part of this application.

TECHNICAL FIELD

The present disclosure relates to the field of display technologies, and particularly to a display panel and a display apparatus.

BACKGROUND

Liquid Crystal Display (LCD) has attracted much attention because of its small size, low power consumption, no radiation, and other advantages. At present, it has been widely applied in mobile phones, vehicles, monitors, televisions, public displays, and other fields. However, a contrast of an LCD panel is only a few thousand, and a display effect of the LCD panel cannot be compared with OLED products. In order to improve the contrast of LCD products, a layer of liquid crystal panel is further disposed on top of a single-layer liquid crystal display panel as a light control panel. However, in order to improve a problem of moire patterns, patterns of conductive layers of a liquid crystal display panel and a light control panel are not exactly same, resulting in low light transmittance of a double-layer panel. A display effect is affected.

SUMMARY

A display panel is provided in an embodiment of the present disclosure, and the display panel includes multiple pixels arranged in an array; each pixel includes multiple sub-pixels; the multiple pixels arranged in the array include multiple pixel rows; each pixel row includes multiple sub-pixels arranged along a first direction, and the multiple pixel rows extend along a second direction; the first direction and the second direction intersect; and the display panel specifically includes: a first array substrate and a first opposite substrate which are disposed opposite to each other, and a first liquid crystal layer which is located between the first array substrate and the first opposite substrate; the first array substrate includes multiple first driving transistors arranged in an array; at least one pixel is spaced between two adjacent first driving transistors in the first direction; the first opposite substrate includes multiple light shielding parts corresponding to the first driving transistors one-to-one; and an orthographic projection of a light shielding part on a plane where the first array substrate is located only covers an orthographic projection of a first driving transistor on the plane where the first array substrate is located.

In some embodiments, n pixels are spaced between two adjacent first driving transistors in the first direction; among them, n is the least common multiple of a quantity of driving transistors and a quantity of pixel units.

In some embodiments, each pixel includes a red sub-pixel, a blue sub-pixel, and a green sub-pixel.

In some embodiments, colors of multiple sub-pixels in each pixel are same.

In some embodiments, the first array substrate further includes: a planar first common electrode located at a side of the first driving transistor facing the first opposite substrate; and the first common electrode includes light-transmitting material.

In some embodiments, the first array substrate further includes: multiple first common voltage signal lines, electrically connected with the first common electrode and disposed in a same layer as a gate of the first driving transistor.

In some embodiments, a shape of an orthographic projection of the light shielding part on the first array substrate is a rectangle with a chamfering angle.

In some embodiments, a length of the rectangle in the first direction is greater than or equal to 30 microns and less than or equal to 180 microns; and a width of the rectangle in the second direction is greater than or equal to 30 microns and less than or equal to 180 microns.

In some embodiments, an included angle between the chamfering angle and the first direction or the second direction is greater than 0° and less than or equal to 70°.

In some embodiments, a length of the chamfering angle in the first direction is greater than 0 microns and less than or equal to 30 microns; and a width of the chamfering angle in the second direction is greater than 0 microns and less than or equal to 30 microns.

A display apparatus is provided in an embodiment of the present disclosure, including: a display panel provided in an embodiment of the present disclosure; and a second display panel, located at a light-emitting side of the display panel.

In some embodiments, the second display panel includes: multiple sub-pixels arranged in an array; the second display panel specifically includes: a second array substrate and a second opposite substrate which are disposed opposite to each other, and a second liquid crystal layer which is located between the second array substrate and the second opposite substrate; the second opposite substrate includes: a light shading layer; the light shielding layer includes an opening region having one-to-one correspondence to sub-pixels of the second display panel, and a light shielding region outside the opening region; and an orthographic projection of the light shielding part on the light shielding layer falls into the light shielding region.

In some embodiments, the first array substrate further includes multiple first data lines and multiple first scan lines intersected with each other; an orthographic projection of the first data lines and the first scan lines on the light shielding layer falls into the light shielding region.

In some embodiments, an orthographic projection of a first common voltage signal line in the first array substrate in the light shielding layer falls into the light shielding region.

BRIEF DESCRIPTION OF DRAWINGS

In order to describe technical solutions in embodiments of the present disclosure more clearly, the drawings to be used in describing the embodiments will be introduced below in brief. Apparently, the drawings described below are only some of the embodiments of the present disclosure, and those of ordinary skills in the art may also obtain other drawings according to these drawings without paying any inventive effort.

DETAILED DESCRIPTION

Figure 1:
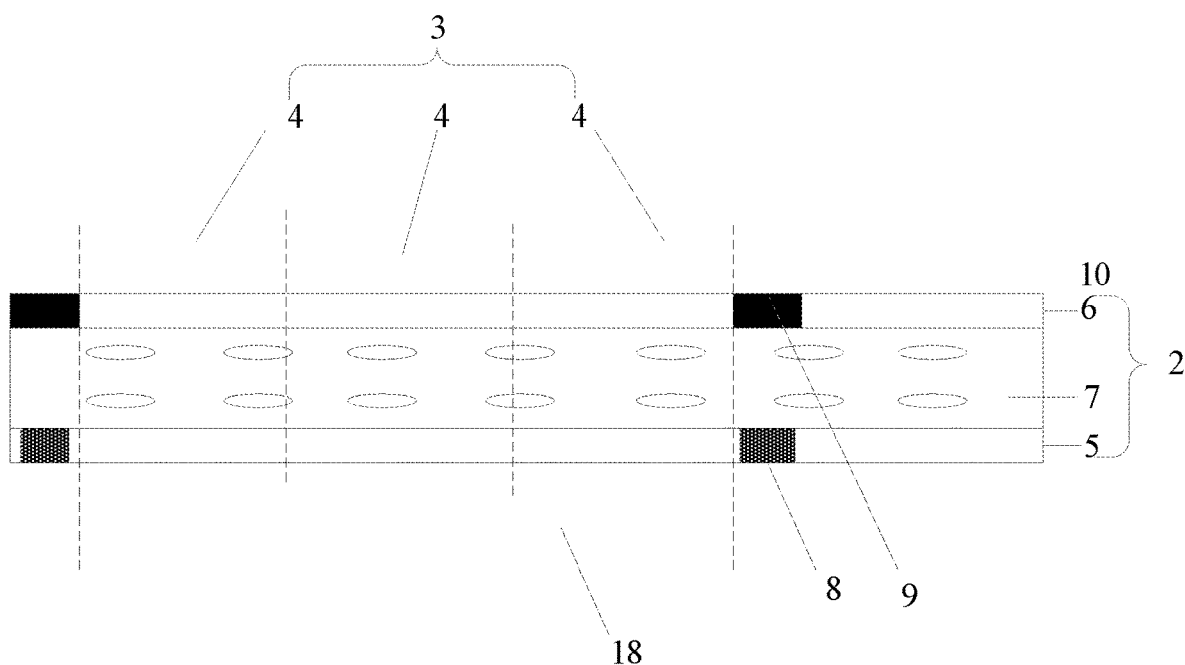
FIG. 1 is a schematic diagram of a structure of a display panel according to an embodiment of the present disclosure.

In order to make objectives, technical solutions, and advantages of embodiments of the present disclosure more clear, the technical solutions of the embodiments of the present disclosure will be clearly and completely described below with reference to the drawings of the embodiments of the present disclosure. Apparently, described embodiments are a part of the embodiments of the present disclosure, not all of the embodiments. Furthermore, without a conflict, embodiments in the present disclosure and features in the embodiments may be combined with each other. Based on the described embodiments of the present disclosure, all other embodiments obtained by those of ordinary skills in the art without inventive effort belong to the protection scope of the present disclosure.

Unless otherwise defined, technical terms or scientific terms used in the present disclosure should have common meanings as understood by those of ordinary skill in the art that the present disclosure belongs to. The "first", "second", and similar terms used in the present disclosure do not indicate any order, quantity, or importance, but are used only for distinguishing different components. "Include", "contain", or a similar term means that elements or objects appearing before the term cover elements or objects listed after the term and their equivalents, but do not exclude other elements or objects. "Connect", "join", or a similar term is not limited to a physical or mechanical connection, but may include an electrical connection, whether direct or indirect.

It should be noted that sizes and shapes of various figures in the drawings do not reflect real proportions, and are only for the purpose of schematically illustrating contents of the present disclosure. Moreover, labeling numbers that are same or similar all the while denote elements that are same or similar or elements that have same or similar functions.

Figure 2:
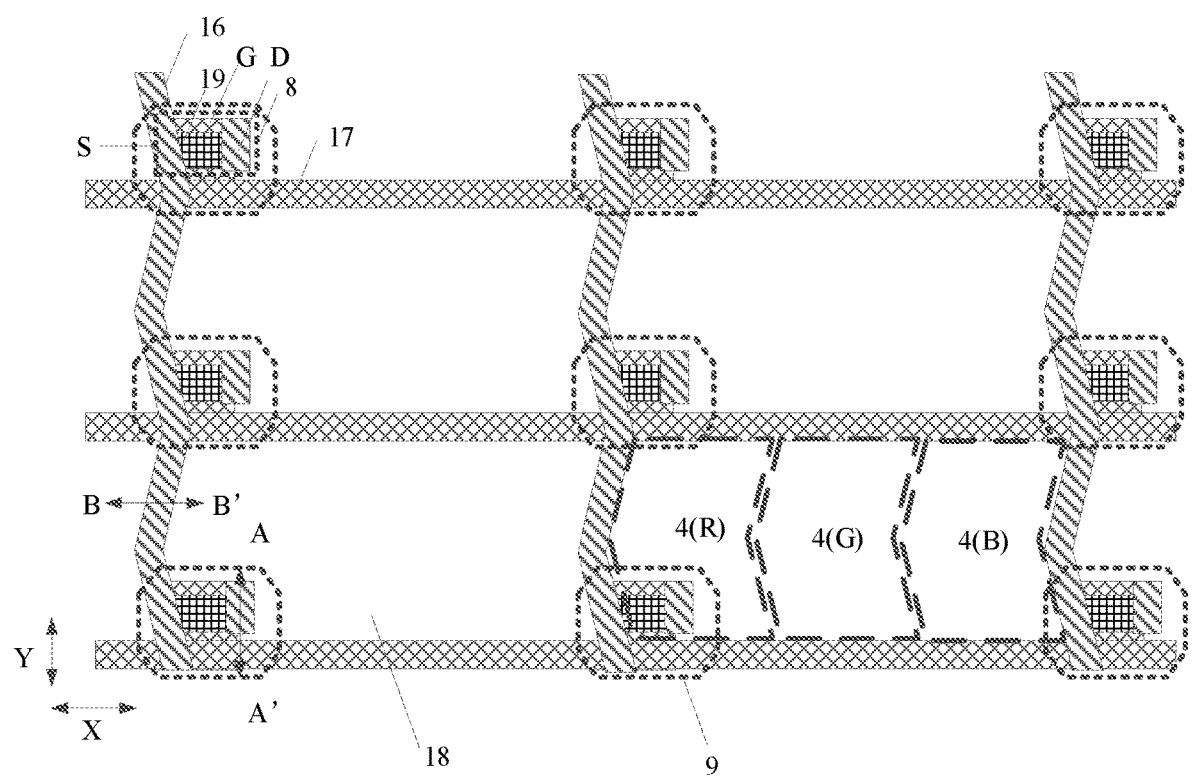
FIG. 2 is a schematic diagram of a structure of a first array substrate in a display panel according to an embodiment of the present disclosure.
Figure 3:
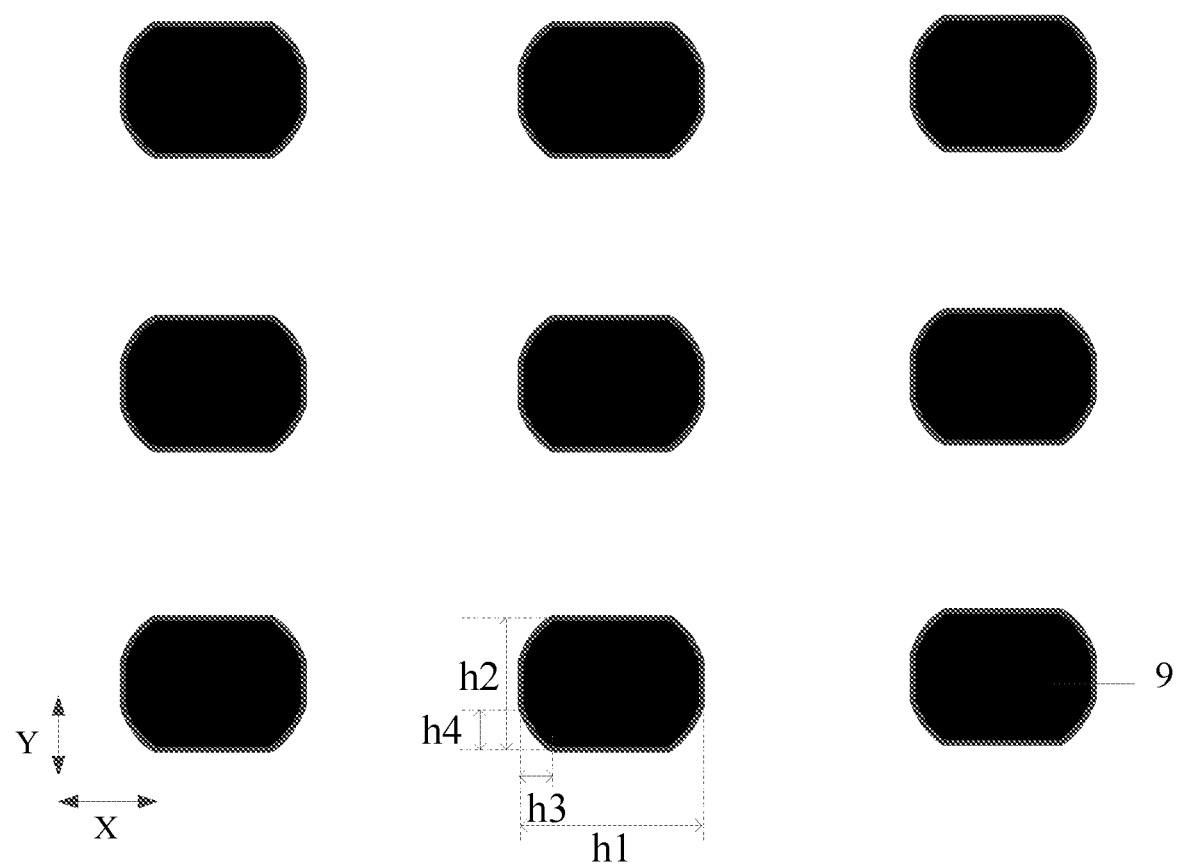
FIG. 3 is a schematic diagram of a structure of a first opposite substrate in a display panel according to an embodiment of the present disclosure.

An embodiment of the present disclosure provides a display panel. As shown in FIGS. 1, 2, and 3, the display panel 2 includes: multiple pixels 3 arranged in an array; each pixel 3 includes multiple sub-pixels 4; the multiple pixels 3 arranged in the array include multiple pixel rows 32; each pixel row 32 includes multiple sub-pixels 4 arranged along a first direction X, and the multiple pixel rows 32 extend along a second direction Y; the first direction X and the second direction Y intersect; and the display panel 2 specifically includes: a first array substrate 5 and a first opposite substrate 6 which are disposed oppositely, and a first liquid crystal layer 7 which is located between the first array substrate 5 and the first opposite substrate 6; the first array substrate includes multiple first driving transistors 8 arranged in an array; at least one pixel 3 is spaced between two adjacent first driving transistors 8 in the first direction X; the first opposite substrate includes multiple light shielding parts 9 corresponding to the first driving transistors 8 one-to-one; and an orthographic projection of a light shielding part 9 on a plane where the first array substrate 5 is located only covers an orthographic projection of a first driving transistor 8 on the plane where the first array substrate 5 is located.

It should be noted that, in the related art, a light shielding region in an opposite substrate of a display panel is a grid-like pattern, and a grid opening region is a light-transmitting region, so light transmittance of the display panel is relatively low. Therefore, when the display panel is applied to a display product including a double-layer display panel, the light transmittance of the display product is low. In addition, in the related art, sub-pixel units in two display panels in a display product of a double-layer display panel correspond one-to-one, which further leads to low light transmittance of double panels. Because of relatively low light transmittance of the double panels, the relatively high backlight brightness is needed, so a working temperature of the display product is relatively high, which easily leads to brightness attenuation and color coordinate offset problems. When the display product is tested, when a color coordinate offset of the display product appears, it is considered that color coordinates of the display product do not conform to a specified range of color coordinates and need to be scrapped, which affects a production yield of display products.

In a display panel according to an embodiment of the present disclosure, at least one pixel is included between two adjacent first driving transistors in the first direction, and a quantity of first driving transistors is far less than a quantity of sub-pixel units. A first driving transistor corresponds to a control unit of the display panel, which is equivalent to reducing a quantity of control units without changing a total area of the display panel, so that light transmittance of the display panel may be improved. Moreover, the first opposite substrate includes multiple light shielding parts, and the light shielding parts only cover a region where the first driving transistor is located, that is, compared with a grid-like pattern of light shielding regions in a first opposite substrate in the related art, the multiple light shielding parts in the display panel of the present disclosure are arranged in an array, which may reduce an area of the light shielding regions in the first opposite substrate and further improve light transmittance of the display panel. Thus, when the display panel according to the embodiment of the present disclosure is applied to a display product of a double-layer display panel, light transmittance of the display product may be improved, a display effect may be improved, and a user experience may be improved. The light transmittance of the display panel is improved, so that required backlight brightness may also be reduced, thereby reducing a working temperature of the display product and avoiding appearing of brightness attenuation and color coordinate offset problems caused by a high temperature. A production yield of display products is improved.

It should be noted that in FIG. 2, a region covered by an orthographic projection of the light shielding part 9 on the first array substrate is schematically illustrated by a dotted line.

It should be noted that the first direction X and the second direction Y in FIGS. 2 and 3 are perpendicular.

In some embodiments, as shown in FIG. 2, the first array substrate further includes: multiple first data lines 16 and multiple first scan lines 17 intersected with each other.

In some embodiments, as shown in FIG. 2, each first scan line 17 extends along the first direction X, and each first data line 16 extends along the second direction Y.

In some embodiments, the first driving transistor may be for example a thin film transistor. As shown in FIG. 2, the first driving transistor includes: a gate G, a source S, a drain D, and an active layer 19. The gate G and the first scan line 17 are disposed in a same layer and electrically connected. The source S and the first data line 16 are disposed in a same layer and electrically connected. In a specific implementation, the first scan line is located at a side of the first data line facing an underlay substrate, and an active layer is for example located between the gate, and the source and the drain, i.e. the thin film transistor has a bottom gate structure.

In some embodiments, as shown in FIG. 2, the display panel includes multiple light control units 18 arranged in an array. That is, multiple first scan lines and multiple first data lines are horizontally and vertically crossed and divided into multiple light control units. A quantity of light control units corresponds to a quantity of first driving transistors one-to-one.

Figure 4:
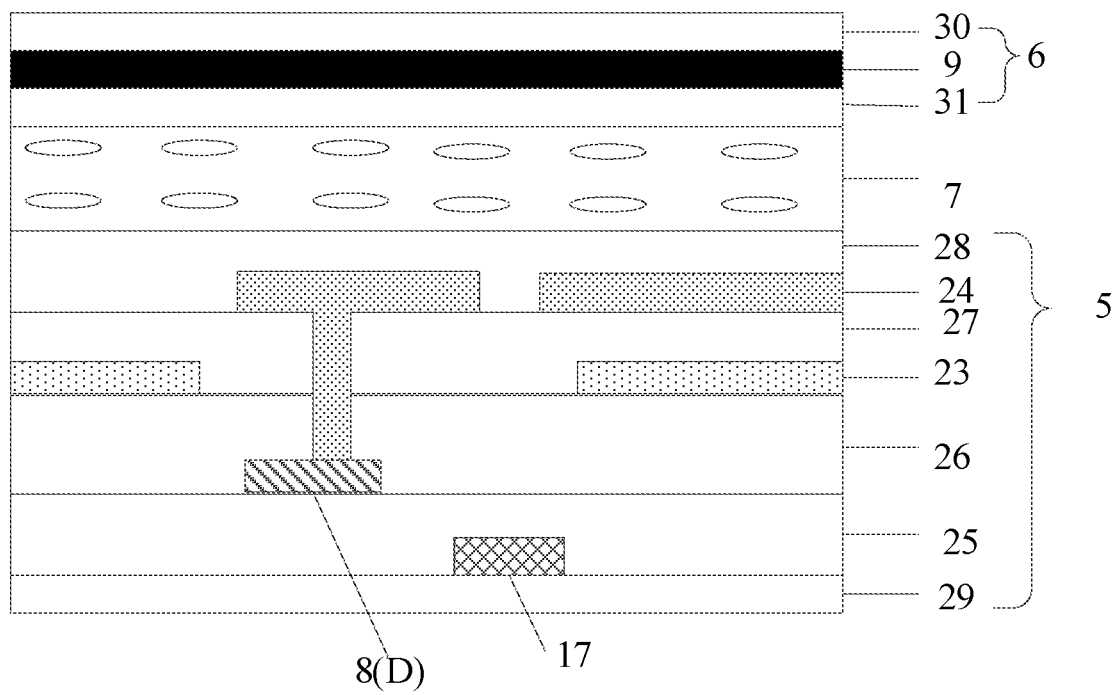
FIG. 4 is a cross-sectional view along AA' in FIG. 2 according to an embodiment of the present disclosure.
Figure 5:
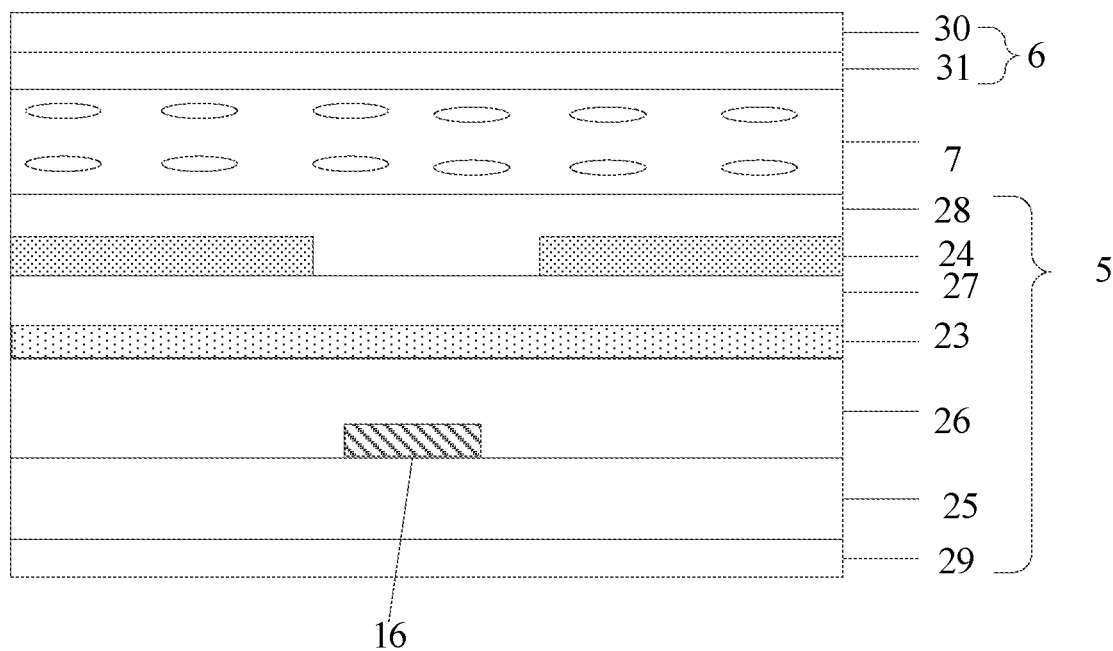
FIG. 5 is a cross-sectional view along BB' in FIG. 2 according to an embodiment of the present disclosure.

In some embodiments, as shown in FIGS. 4 and 5, the first array substrate further includes: a planar first common electrode 23 located at a side of the first driving transistor 8 facing the first opposite substrate 6; the first common electrode 23 includes a light-transmitting material.

It should be noted that FIG. 4 may, for example, be a cross-sectional view along AA' in FIG. 2, and FIG. 5 may, for example, be a cross-sectional view along BB' in FIG. 2. The first common electrode is not shown in FIG. 2.

In a display panel according to an embodiment of the present disclosure, the first common electrode is a planar electrode, and the material of the first common electrode is light transmitting material, so that an aperture ratio of a light control unit of the first display panel may be further improved, and the light transmittance of the display panel may be improved.

In some embodiments, as shown in FIGS. 4 and 5, each light control unit of the first array substrate further includes a first pixel electrode 24. The first pixel electrode 24 is located at a side of the first common electrode 23 away from the first driving transistor 8.

In some embodiments, as shown in FIGS. 4 and 5, the first array substrate 5 further includes: a first underlay substrate 29 at a side of the gate G away from the drain D, a gate insulating layer 25 located between the gate G and the drain D, a first insulating layer 26 located between the drain D and the first common electrode 23, a second insulating layer 27 located between the first common electrode 23 and the first pixel electrode 24, and a third insulating layer 28 located between the first pixel electrode 24 and the first liquid crystal layer 7. The first pixel electrode 24 is electrically connected with the drain D through a via penetrating the second insulating layer 27 and the first insulating layer 26.

It should be noted that the first common electrode is integrally connected to form a planar electrode except for a region where the first pixel electrode and the drain are electrically connected.

In some embodiments, as shown in FIGS. 4 and 5, the first opposite substrate 6 further includes a second underlay substrate 30. The light shielding part 9 is located at a side of the second underlay substrate 30 facing the first liquid crystal layer 7. The first opposite substrate 6 further includes a protective layer 31 located at a side of the light shielding part 9 away from the second underlay substrate 30.

In some embodiments, the first array substrate further includes: multiple first common voltage signal lines, electrically connected with the first common electrode and disposed in a same layer as a gate of the first driving transistor.

In a specific implementation, an extension direction of the first common voltage signal line may be set to be same as an extension direction of the first scan line. Multiple first common voltage signal lines are disposed adjacent to multiple first scan lines in one-to-one correspondence.

In some embodiments, n pixels are spaced between two adjacent first driving transistors in the first direction; wherein n is the least common multiple of a quantity of driving transistors and a quantity of pixel units.

That is, in some embodiments, each light control unit corresponds to n pixels.

In some embodiments, as shown in FIG. 2, each light control unit 18 corresponds to one pixel 3.

In some embodiments, as shown in FIGS. 1 and 2, each pixel 3 includes three sub-pixels 4.

In some embodiments, colors of sub-pixels in each pixel are different.

In a specific implementation, as shown in FIG. 2, each pixel 4 includes for example a red sub-pixel R, a blue sub-pixel B, and a green sub-pixel G.

Of course, in some embodiments, each pixel may also include four sub-pixels or more sub-pixels. When each pixel includes four sub-pixels, for example, each pixel includes: a red sub-pixel, a blue sub-pixel, a green sub-pixel, and a white sub-pixel.

Figure 6:
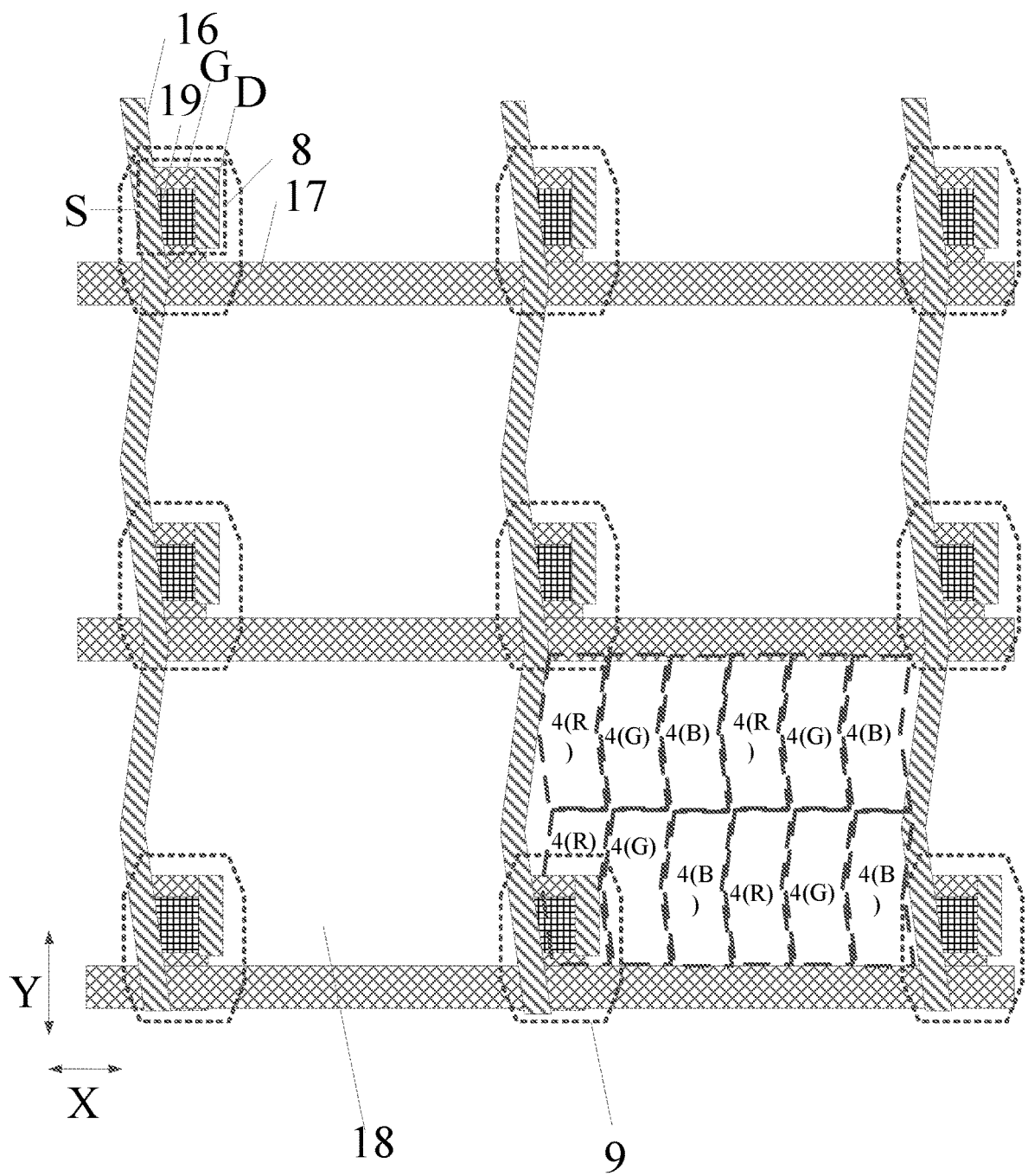
FIG. 6 is a schematic diagram of a structure of a first array substrate in another display panel according to an embodiment of the present disclosure.

In some embodiments, each light control unit may also correspond to multiple pixels. For example, as shown in FIG. 6, each light control unit 18 corresponds to four pixels 3.

In some embodiments, colors of multiple sub-pixels in each pixel are same. That is, the display panel is used for achieving gray scale adjustment.

In some embodiments, as shown in FIG. 3, a shape of an orthographic projection of the light shielding part on the first array substrate is a rectangle with a chamfering angle.

In this way, while shielding the first driving transistor, an area of an orthographic projection of the light shielding part on the first array substrate may be reduced as much as possible, so that the light transmittance of the first display panel is improved, and the light transmittance of the display panel is improved.

Of course, the orthographic projection of the light shielding part on the first array substrate may also be of other shapes. For example, the orthographic projection of the light shielding part on the first array substrate may be of a circle, a rectangle, or another polygon.

In some embodiments, a length h1 of the rectangle in the first direction X is greater than or equal to 30 microns and less than or equal to 180 microns; and a width h2 of the rectangle in the second direction Y is greater than or equal to 30 microns and less than or equal to 180 microns.

In a specific implementation, a size of the light shielding part may be practically selected according to a size of the first driving transistor, so that the light shielding part covers the first driving transistor.

In some embodiments, the length h1 of the rectangle in the first direction X is 91.5 microns, and the width h2 of the rectangle in the second direction Y is 66 microns.

In some embodiments, an included angle between the chamfering angle and the first direction or the second direction is greater than 0° and less than or equal to 70°.

In some embodiments, a length h3 of the chamfering angle in the first direction X is greater than 0 microns and less than or equal to 30 microns; and a width h4 of the chamfering angle in the second direction Y is greater than 0 microns and less than or equal to 30 microns.

Figure 7:
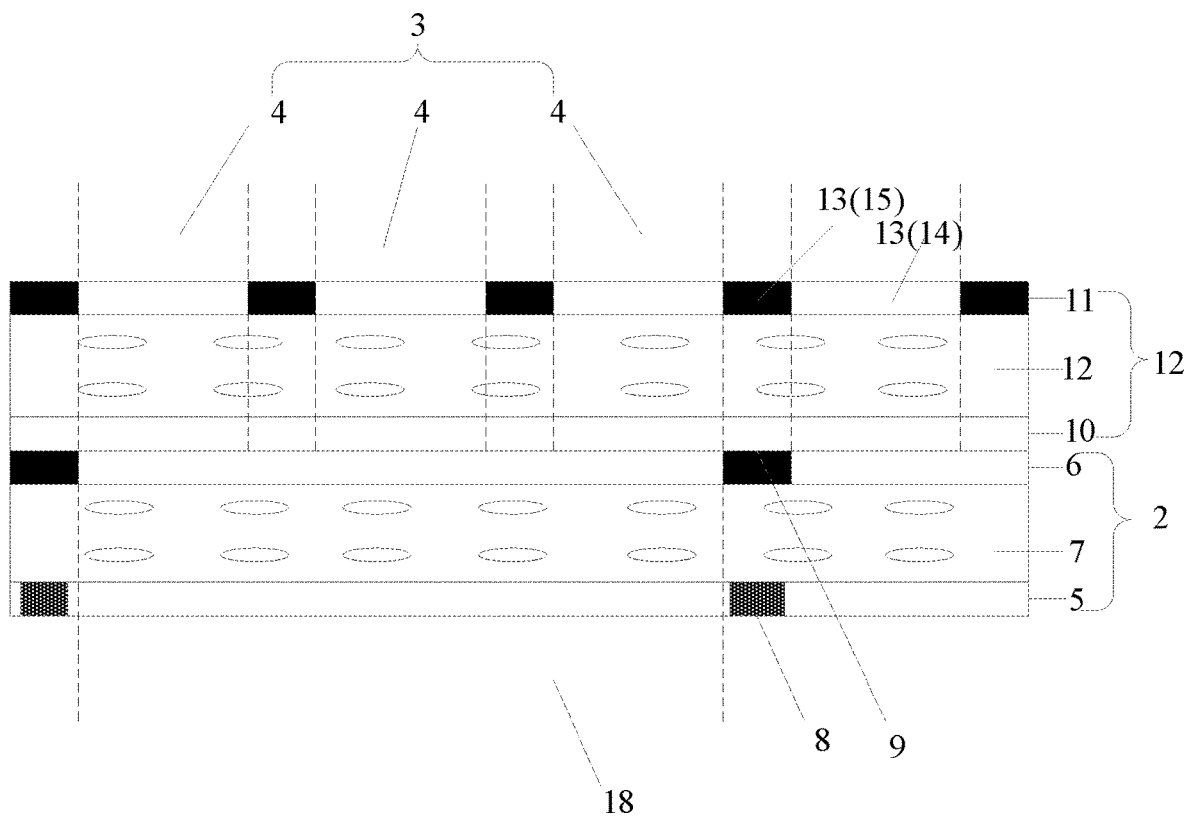
FIG. 7 is a schematic diagram of a structure of a display apparatus according to an embodiment of the present disclosure.

Based on a same inventive concept, an embodiment of the present disclosure also provides a display apparatus, as shown in FIG. 7, including: the display panel 2 according to the embodiment of the present disclosure; and a second display panel 1, located at a light-emitting side of the display panel 2.

In a specific implementation, the display panel 2 may for example be taken as a light control panel, and the display panel 2 will be referred to as a first display panel in the following description for ease of distinction.

Figure 8:
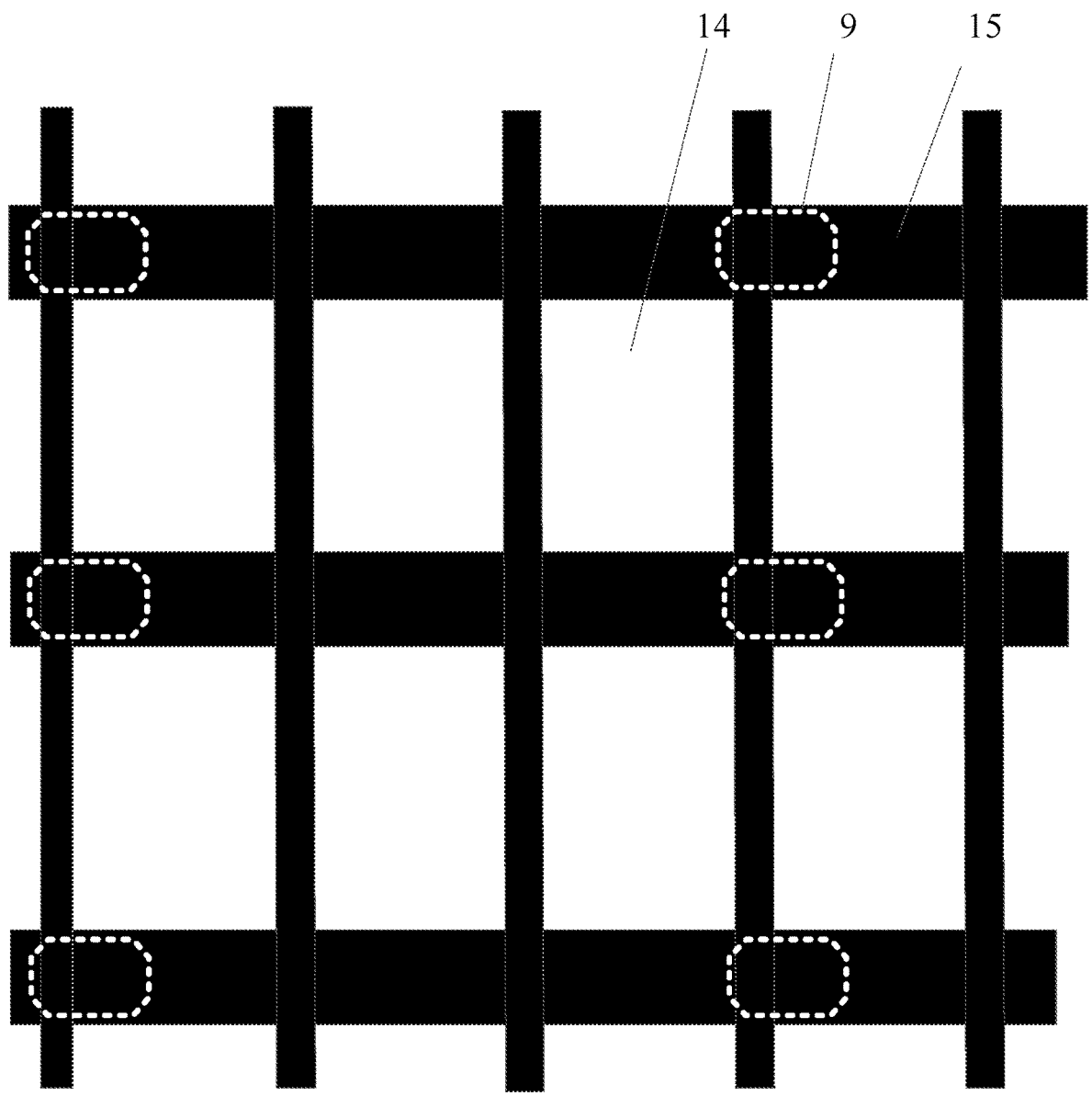
FIG. 8 is a schematic diagram of a structure of a second opposite substrate in a second display panel according to the embodiment of the present disclosure.

In some embodiments, as shown in FIG. 7, the second display panel includes multiple pixels 3 arranged in an array; each pixel 3 includes multiple sub-pixels 4; the second display panel specifically includes: a second array substrate 10 and a second opposite substrate 11 which are disposed opposite to each other, and a second liquid crystal layer 12 which is located between the second array substrate 10 and the second opposite substrate 11; as shown in FIG. 1 and FIG. 8, the second opposite substrate includes: a light shading layer 13; the light shielding layer 13 includes an opening region 14 having one-to-one correspondence to sub-pixels 4 of the second display panel, and a light shielding region 15 outside the opening region 14; and an orthographic projection of the light shielding part on the light shielding layer falls into the light shielding region 15.

In the display apparatus according to the embodiment of the present disclosure, the light shielding part of the first display panel is disposed in a region covered by the light shielding region of the second display panel, so that the light transmittance after overlapping of the first display panel and the second display panel may be further reduced, the light transmittance of the display apparatus may be further improved, a display effect may be improved, and a user experience may be improved.

In some embodiments, an orthographic projection of the first data line and the first scan line in the light shielding layer falls into the light shielding region.

In the display apparatus according to the embodiment of the present disclosure, the first data line and the first scan line of the first display panel are disposed in a region covered by the light shielding region of the second display panel, so that the light transmittance after overlapping of the first display panel and the second display panel may be further reduced, the light transmittance of the display apparatus may be further improved, a display effect may be improved, and a user experience may be improved.

In some embodiments, an orthographic projection of a first common voltage signal line in the light shielding layer falls into the light shielding region.

Figure 9:
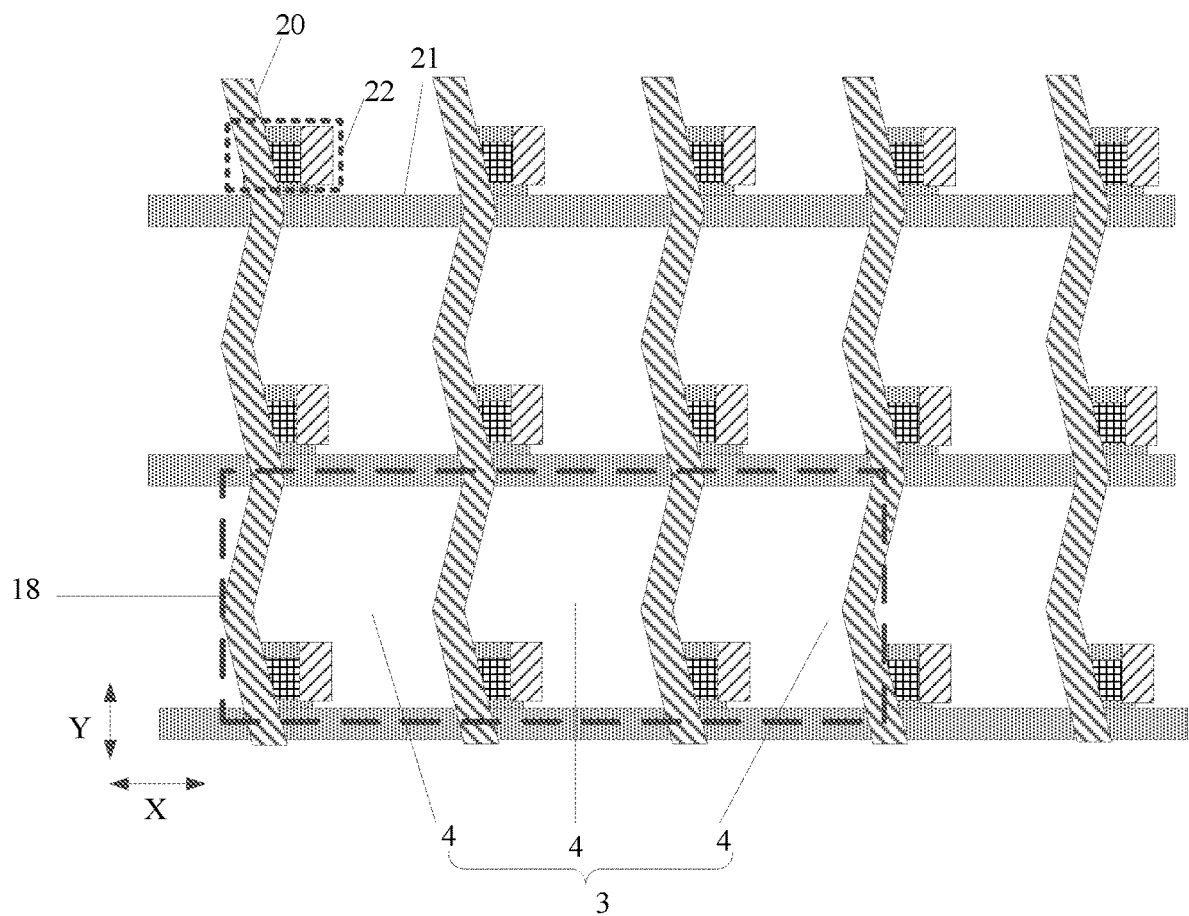
FIG. 9 is a schematic diagram of a structure of a second array substrate in a second display panel according to an embodiment of the present disclosure.
Figure 10:
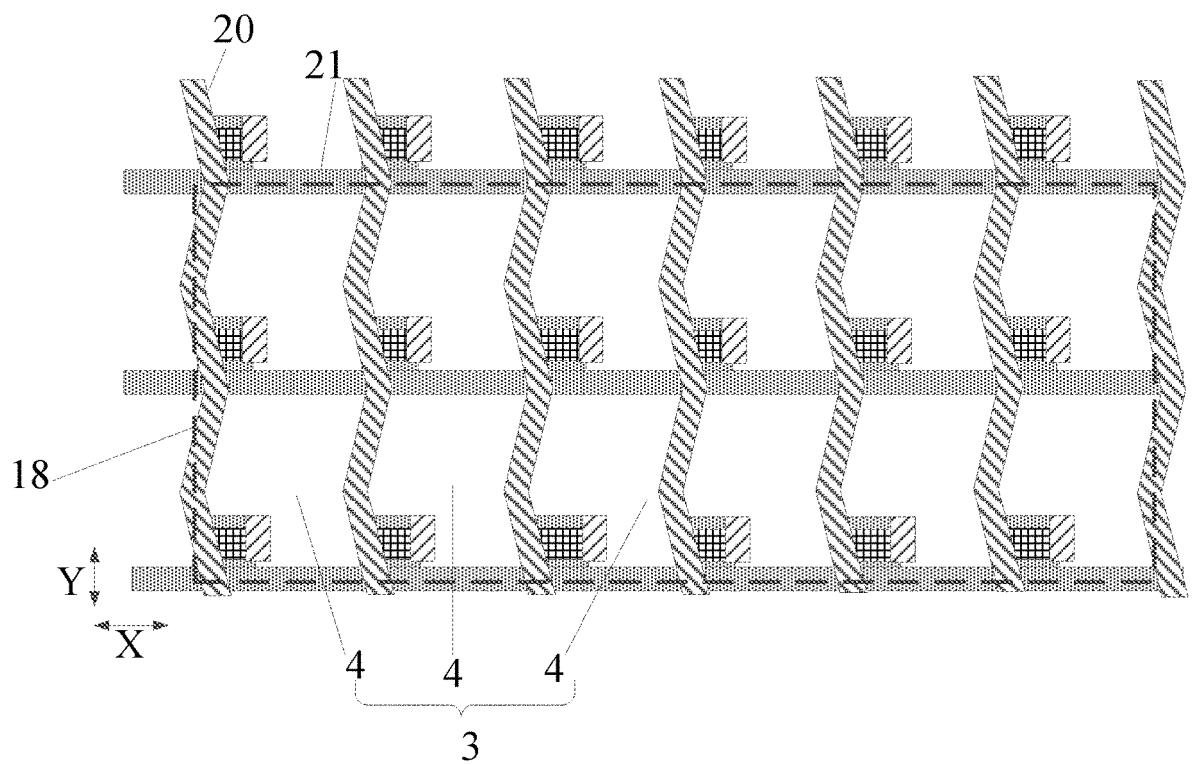
FIG. 10 is a schematic diagram of a structure of a second array substrate in another second display panel according to an embodiment of the present disclosure.

In some embodiments, as shown in FIGS. 9 and 10, the second array substrate includes: a second data line 20, a second scan line 21, and a second driving transistor 22.

In a specific implementation, the second driving transistor includes: a gate, a source, a drain, and an active layer. The gate of the second driving transistor and the second scan line are disposed in a same layer and electrically connected. The source of the second driving transistor and the second data line are disposed in a same layer and electrically connected.

In a specific implementation, the second array substrate further includes: a second pixel electrode and a second common electrode.

It should be noted that in the display apparatus according to the embodiment of the present disclosure, both the second display panel and the first display panel are liquid crystal panels. That is, the display apparatus includes a double-layer liquid crystal panel. The first display panel includes multiple light control units, so that each light control unit may independently control light and shade, which may make a picture displayed by the display apparatus more delicate to improve a display effect. In a specific implementation, the first opposite substrate of the first display panel does not need to be provided with a color film. And the second opposite substrate of the second display panel needs to be provided with a color film. In a specific implementation, in the second opposite substrate of the second display panel, the color film is disposed in a light-transmitting region of the light shielding layer.

It should be noted that FIG. 9 illustrates an example of a light control unit of the first display panel corresponding to a pixel of the second display panel. FIG. 10 illustrates an example of a light control unit of the first display panel corresponding to four pixels of the second display panel.

In some embodiments, as shown in FIGS. 2, 6, 9, and 10, each first data line 16 is a polygonal line, and each second data line 20 is a polygonal line.

In some embodiments, as shown in FIGS. 2, 6, 9, and 10, a bending direction of the first data line 16 corresponding to each light control unit 18 in the first display panel towards the light control unit 18 is same as a bending direction of the second data line 20 corresponding to each sub-pixel unit 4 in the second display panel towards the sub-pixel unit 4.

It should be noted that, in the related art, bending directions of data lines of two liquid crystal panels are different, and the light shielding region of the opposite substrate of the first display panel needs to cover data lines of the first display panel, so a bending region of the data lines of the first display panel has a greater influence on transmittance of the second display panel.

In the display apparatus according to the embodiment of the present disclosure, a bending direction of the first data line corresponding to each light control unit to the light control unit is same as a bending direction of the second data line corresponding to each sub-pixel unit to the sub-pixel unit, so that the first data line in the first display panel is conveniently disposed within a coverage area of the light shielding region of the liquid crystal panel, and an influence of the first data line on light transmittance of the second display panel may be avoided. Therefore, transmittance of a display apparatus including two layers of liquid crystal panels may be improved.

In some embodiments, the display apparatus further includes: a backlight module located at a side of the first display panel away from the second display panel.

Next an example will be given of the display apparatus according to the embodiment of the present disclosure which may improve light transmittance.

Figure 11:
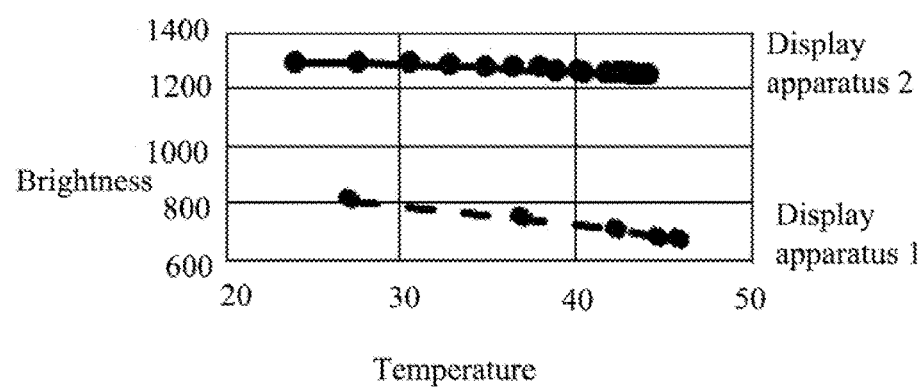
FIG. 11 is a curve graph of brightness versus temperature of a display panel according to an embodiment of the present disclosure.
Figure 12:
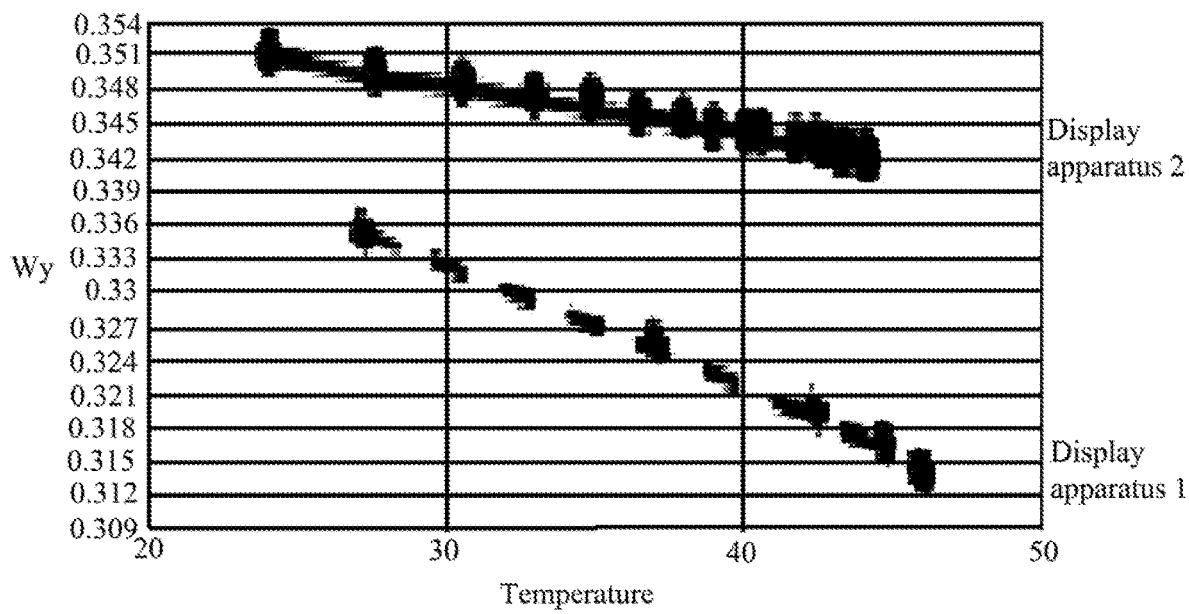
FIG. 12 to FIG. 17 are curve graphs of color coordinate versus temperature of a display panel according to an embodiment of the present disclosure.
Figure 13:
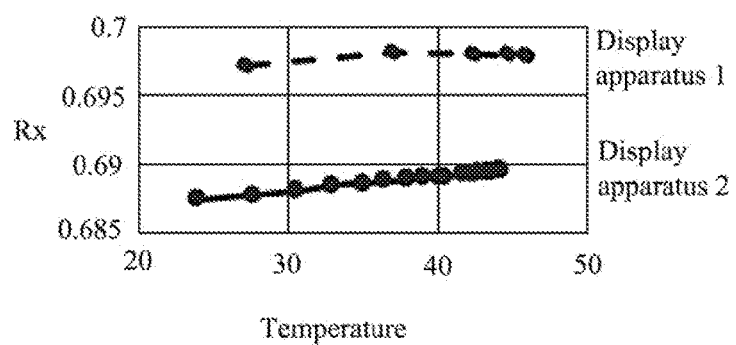
Figure 14:
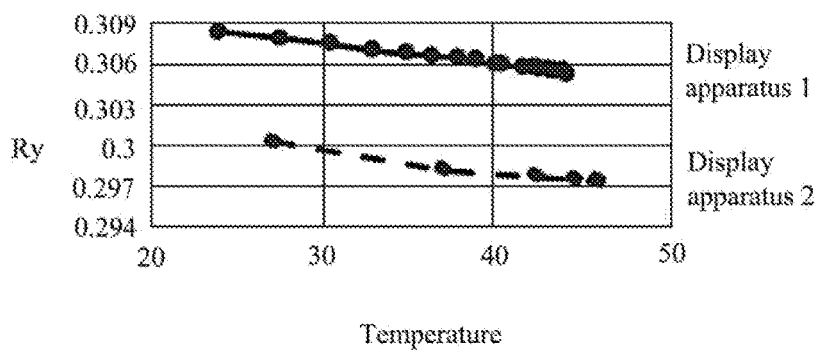
Figure 15:
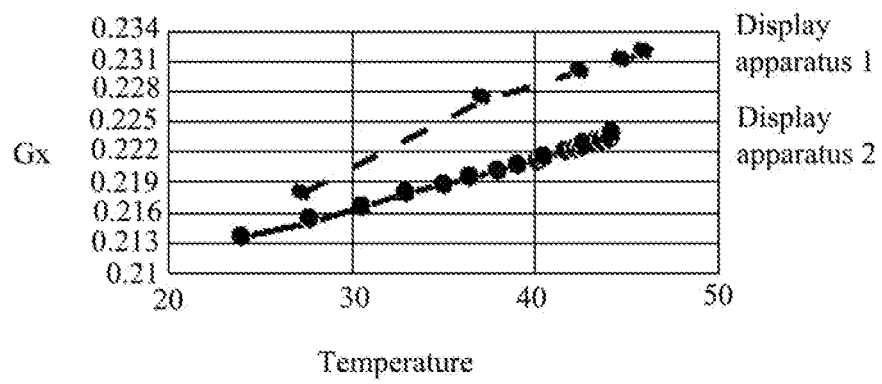
Figure 16:
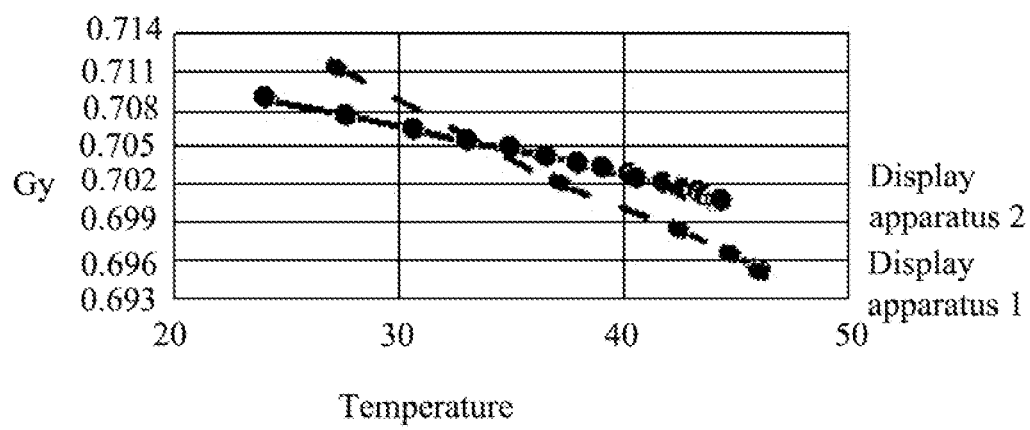
Figure 17:
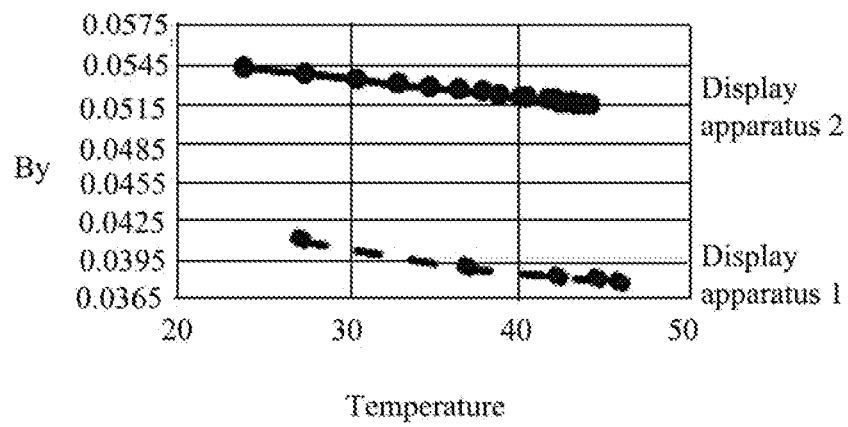

In the related art, light control units of the first display panel corresponds to sub-pixel units of the second display panel one-to-one, and a pattern of the shielding region of the first display panel is grid-shaped, an aperture ratio of the first display panel is usually 55% to 57%, an aperture ratio of the second display panel is usually 55% to 57%, and an aperture ratio of a panel after the first display panel and the second display panel are fitted is usually 45% to 50%. And in the display apparatus according to the embodiment of the present disclosure, under a condition of not changing a disposing mode of the second display panel, when the first display panel satisfies the following conditions: one light control unit corresponds to three sub-pixel units (i.e., one pixel); the first display panel includes multiple light shielding parts arranged in an array; the light shielding part, the first data line, and the first scan line are all disposed in a coverage area of the light shielding region of the second display panel; the first common electrode is a planar electrode; an aperture ratio of the first display panel may be increased to about 79.1%. Compared with the related art, the light transmittance of the first display panel may be greatly improved. An aperture ratio of the panel after the first display panel and the second display panel are fitted may be increased to 52.5% to 56.7%, and the light transmittance of the fitted panel according to the embodiment of the present disclosure may be increased by 60% compared with the related art. Relationship curves of brightness versus temperature of the display apparatus 1 according to the related art and the display apparatus 2 according to the embodiment of the present disclosure are shown in FIG. 11. Relationship curves of color coordinate and temperature of the display apparatus 1 according to the related art and the display apparatus 2 according to the embodiment of the present disclosure are shown in FIGS. 12 to 17. Among them, R represents a red sub-pixel, G represents a green sub-pixel, B represents a blue sub-pixel, and W represents a white sub-pixel. Compared with the related art, brightness of the backlight module of the display apparatus according to the embodiment of the present disclosure may be reduced by 10000 nits, and a working temperature of the backlight module may be reduced by 10° ° C., which may greatly improve brightness attenuation and color coordinate drift problems of the display apparatus.

The display apparatus according to the embodiment of the present disclosure is: any product or component with a display function, such as a mobile phone, a tablet computer, a television, a display, a laptop computer, a digital photo frame, or a navigator, etc. Other essential components of the display apparatus should be understood to be included in the display apparatus by those of ordinary skill in the art, which will not be repeated here, and should not be taken as a limitation on the present disclosure.

To sum up, for the display panel and the display apparatus according to the embodiment of the present disclosure, the first opposite substrate of the first display panel includes multiple light shielding parts, and the light shielding parts only cover a region where the first driving transistor is located, that is, compared with a grid-like pattern of light shielding regions in a first opposite substrate in the related art, the multiple light shielding parts in the first display panel of the present disclosure are arranged in an array, which may reduce an area of the light shielding regions in the first opposite substrate, further improve the light transmittance of the first display panel, and improve light transmittance of the display apparatus. A display effect is improved, and a user experience is improved. The light transmittance of the display apparatus is improved, so that required backlight brightness may also be reduced, thereby reducing a working temperature of the display product and avoiding appearing of brightness attenuation and color coordinate offset problems caused by a high temperature.

Although preferred embodiments of the present invention have been described, those skilled in the art may make additional changes and modifications to these embodiments once basic inventive concepts are known. Therefore, the appended claims are intended to be interpreted to encompass preferred embodiments as well as all changes and modifications falling within the scope of the present invention.

Apparently, those skilled in the art may make various modifications and variations to the embodiments of the present invention without departing from the spirit and the scope of the embodiments of the present invention. Thus, if these modifications and variations to the embodiments of the present invention fall within the scope of the claims of the present invention and their equivalent techniques, the present invention is intended to include these modifications and variations.

The invention claimed is:

1. A display panel, wherein the display panel comprises: a plurality of pixels arranged in an array; each of the pixels comprises a plurality of sub-pixels; the plurality of pixels arranged in the array comprise a plurality of pixel rows; each of the pixel row comprises a plurality of sub-pixels arranged along a first direction, and the plurality of pixel rows extend along a second direction; the first direction and the second direction intersect;

the display panel specifically comprises: a first array substrate and a first opposite substrate which are disposed opposite to each other, and a first liquid crystal layer which is located between the first array substrate and the first opposite substrate; the first array substrate comprises a plurality of first driving transistors arranged in an array; at least one pixel is spaced between two adjacent first driving transistors in the first direction; the first opposite substrate comprises a plurality of light shielding parts corresponding to the first driving transistors one-to-one; and an orthographic projection of each of the light shielding parts on a plane where the first array substrate is located only covers an orthographic projection of a respective one of the first driving transistors on the plane where the first array substrate is located, wherein a shape of an orthographic projection of a light shielding part on the first array substrate is a rectangle with a chamfering angle, and a length of the rectangle in the first direction is greater than or equal to 30 microns and less than or equal to 180 microns, and a width of the rectangle in the second direction is greater than or equal to 30 microns and less than or equal to 180 microns.

2. The display panel of claim 1, wherein each of the pixels comprises: a red sub-pixel, a blue sub-pixel, and a green sub-pixel.

3. The display panel of claim 1, wherein colors of the plurality of sub-pixels in each of the pixels are same.

4. The display panel of claim 1, wherein the first array substrate further comprises: a planar first common electrode located at a side of the first driving transistor facing the first opposite substrate; and the first common electrode comprises light-transmitting material.

5. The display panel of claim 4, wherein the first array substrate further comprises:

a plurality of first common voltage signal lines, electrically connected with the first common electrode and disposed in a same layer as a gate of the first driving transistor.

6. The display panel of claim 1, wherein an included angle between the chamfering angle and the first direction or the second direction is greater than 0° and less than or equal to 70°.

7. A display apparatus, comprising:
the display panel of claim 1; and
a second display panel, located at a light-emitting side of the display panel.

8. The display apparatus of claim 7, wherein the second display panel comprises: a plurality of sub-pixels arranged in an array;
the second display panel specifically comprises: a second array substrate and a second opposite substrate which are disposed opposite to each other, and a second liquid crystal layer which is located between the second array substrate and the second opposite substrate; the second opposite substrate comprises: a light shading layer; the light shielding layer comprises an opening region having one-to-one correspondence to sub-pixels of the second display panel, and a light shielding region outside the opening region; and an orthographic projection of the light shielding part on the light shielding layer falls into the light shielding region.

9. The display apparatus of claim 8, wherein the first array substrate further comprises: a plurality of first data lines and a plurality of first scan lines intersected with each other; an orthographic projection of the first data lines and the first scan lines in the light shielding layer falls into the light shielding region.

10. The display apparatus of claim 7, wherein an orthographic projection of a first common voltage signal line in the first array substrate in the light shielding layer falls into the light shielding region.

* * * * *